Nov. 11, 1958   F. A. HAYES   2,860,267
DYNAMOELECTRIC MACHINES
Filed March 16, 1955   3 Sheets-Sheet 1

WITNESS
William Martins

INVENTOR.
Frank A. Hayes
BY
Marshall J. Breen
ATTORNEY

Nov. 11, 1958  F. A. HAYES  2,860,267
DYNAMOELECTRIC MACHINES
Filed March 16, 1955  3 Sheets-Sheet 2
Fig.4
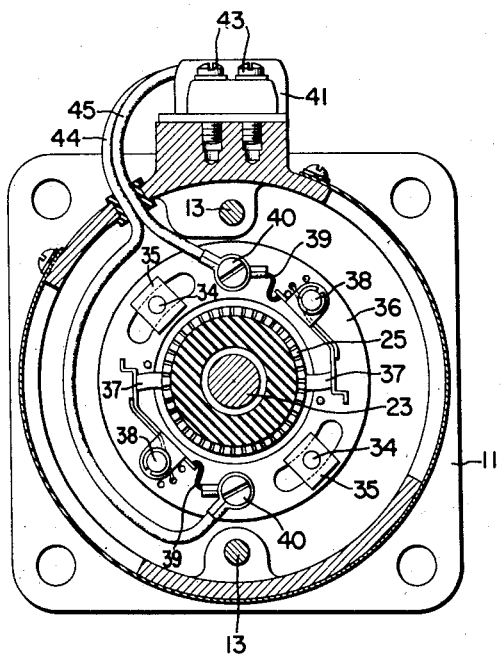
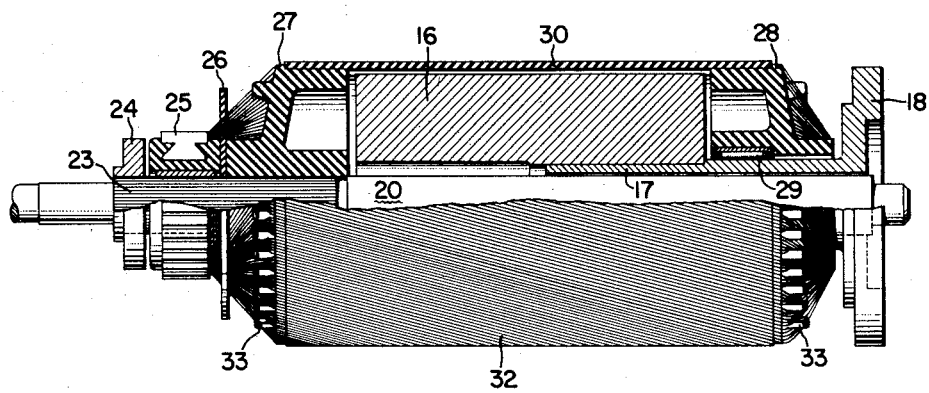
Fig.5
WITNESS
William Martins
INVENTOR.
Frank A. Hayes
BY
Marshall J. Green
ATTORNEY Nov. 11, 1958  F. A. HAYES  2,860,267
DYNAMOELECTRIC MACHINES
Filed March 16, 1955  3 Sheets-Sheet 3
Fig. 7
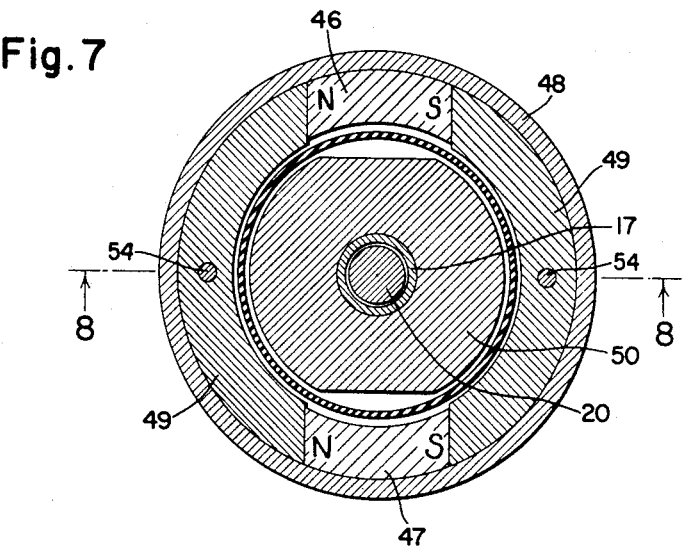
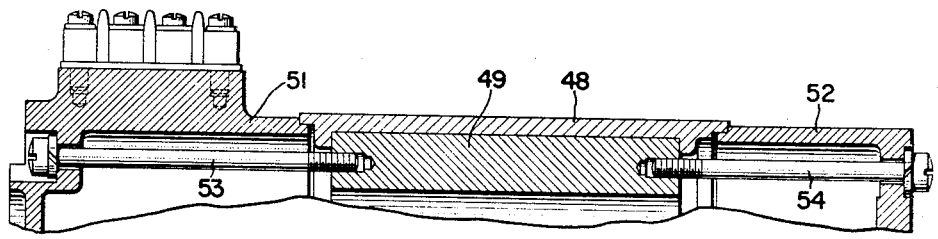
Fig. 8
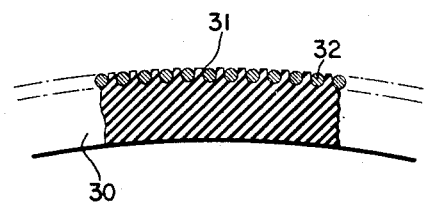
Fig. 6
WITNESS
William Martin
INVENTOR.
Frank A. Hayes
BY
Marshall J. Breen
ATTORNEY United States Patent Office 2,860,267
Patented Nov. 11, 1958

2,860,267

DYNAMOELECTRIC MACHINES

Frank A. Hayes, Middletown, N. J., assignor to The Singer Manufacturing Company, Elizabeth, N. J., a corporation of New Jersey Application March 16, 1955, Serial No. 494,609

1 Claim. (Cl. 310—266)

This invention relates to dynamoelectric machines and more particularly to commutator-type generators for supplying speed-responsive direct-current voltages.

In electrical control systems it is customary to employ tachometer signal voltage sources which are responsive to the speed being controlled. Any transient effect superimposed on the speed voltage furnished by these sources is, in effect, an erroneous signal, but the system, being desirably sensitive, responds to the error and makes a wrong correction. Thus it becomes exceedingly important that tachometer generators be so constructed that the ripple content of the output voltage be very small.

In conventional D. C. generators undesirable ripples in the output voltage have been caused by the following factors:

(1) Variation in flux through the armature due to residual magnetism, hysteresis and eddy current effects.

(2) Variation in flux due to variation in the reluctance of the flux path by the movement of the armature coil slots under the pole pieces.

(3) Variation in the rate of change of flux linkages due to irregular bunches of conductors entering and leaving the flux path.

(4) Leakage or cross-field flux in the coils undergoing commutation.

According to the present invention these factors have been removed by the following constructional features:

(1) The iron or flux-carrying parts of the machine are stationary.

(2) There are no iron teeth in the armature core.

(3) The armature winding comprises a single layer of equally-spaced and skewed conductors.

(4) The armature core is shaped to minimize the cross-field flux.

It is an object of this invention to provide a D. C. generator of the commutator type so constructed as to generate unidirectional output voltages which are especially free from spurious variations or ripples.

It is a further object of this invention to provide a tachometer generator for supplying a D. C. speed-responsive voltage signal substantially free of transient effects.

With the above and other objects in view, as will hereinafter appear, the invention comprises the devices, combinations and arrangements of parts hereinafter set forth and illustrated in the accompanying drawings of preferred embodiments of the invention, from which the several features of the invention and the advantages attained thereby, will be readily understood by those skilled in the art.

In the drawings:

Fig. 4 is a transverse section, partly in elevation, taken on line 4—4 of Fig. 1.

Fig. 5 is a longitudinal section, partly in elevation, taken through a subassembly forming part of the structure of Fig. 1.

Fig. 6 is a fragmentary sectional detail taken transversely through the wall of the winding-carrier of Fig. 1.

Fig. 7 is a transverse section through a structure modified from that of Fig. 2.

Fig. 8 is a fragmentary longitudinal section, partly in elevation, taken on the line 8—8 of Fig. 7.

Figure 1:
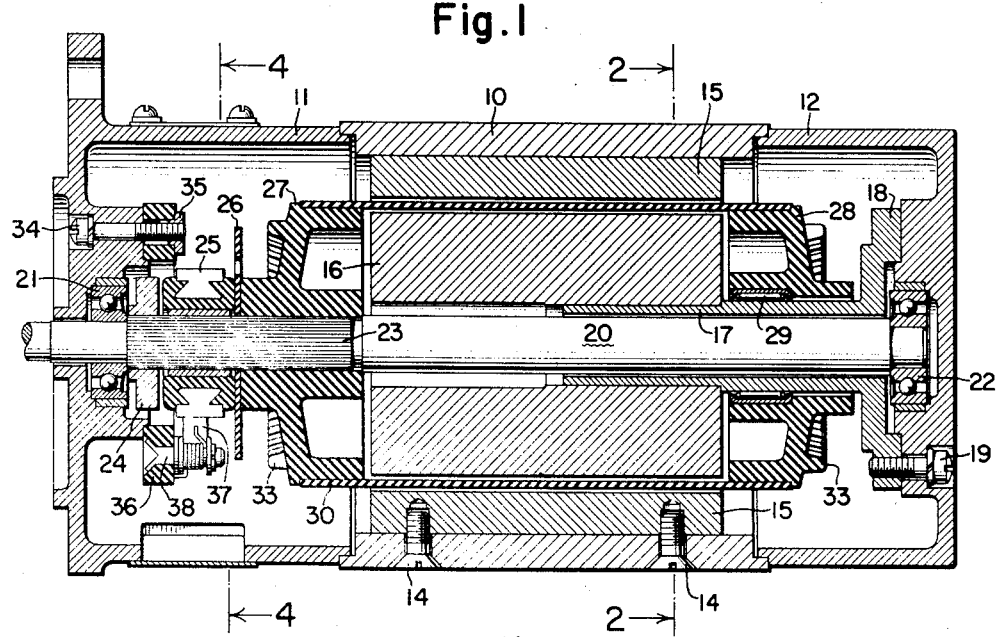
Fig. 1 is a longitudinal section, partly in elevation, taken through a machine embodying the invention.
Figure 2:
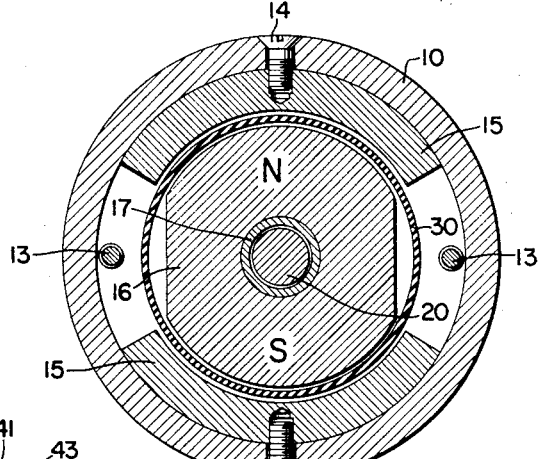
Fig. 2 is a transverse section taken on the line 2—2 of Fig. 1.
Figure 3:
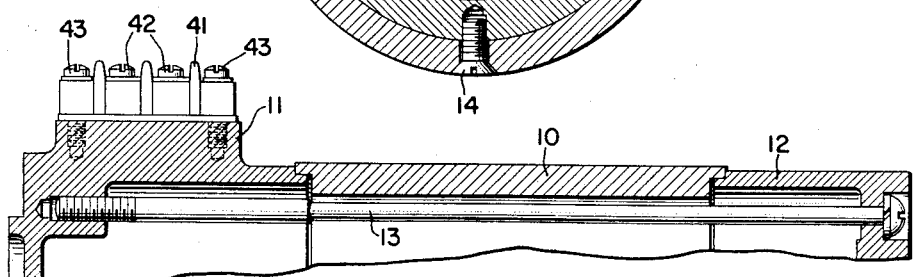
Fig. 3 is a fragmentary section taken in a plane rotated 90° from that of the section of Fig. 1.

Referring now to Fig. 1, a dynamoelectric machine is shown having a casing comprising a yoke member 10 and interfitting end bearing supports 11 and 12 secured together by means of through-screws 13 (Fig. 3). Secured by screws 14 to the inner surface of the yoke 10 are arcuate magnetic pole-pieces 15 arranged in diametrically opposed relation to define a flux axis as seen best in Fig. 2. A hollow inner core member 16 is supported on a quill 17 formed with a flanged end 18 for securing it to the end bearing support 12 by means of screws 19. The core 16 is shuttle-shaped, made of permanent-magnet material magnetized on its principal diameter as indicated by N–S, and supplies the field flux for the machine.

A shaft 29 extends freely through the quill 17 and through the inner core and is journaled in bearings 21 and 22 respectively supported in the end supports 11 and 12. The shaft 20 is formed at one end with a straight-knurled portion 23 to which is secured a balancing collar 24, a commutator 25, an insulating dics 26 and a first rotor-supporting flange 27 preferably made of molded insulating material. Located at the opposite end of the inner core 16 is a second insulated rotor-supporting flange 28 within which may be fitted a needle bearing 29 which rolls on the outer surface of the quill 17. A thin-walled cylindrical tube or shell 30 of non-magnetic material is carried by and secured at each end by the respective end-flanges 27 and 28 for rotation with the shaft 20 in the annular air-gap formed between the pole-pieces 15 and the inner core member 16. A ball bearing may be substituted for the needle bearing 29 if desired.

The outer surface of the tube 30, which is preferably made of molded insulating material, is formed with generally longitudinal milled grooves 31 of considerable skew angle. The grooves are equally and precisely spaced circumferentially and each groove provides an exactly located seat for a single conductor 32 as seen best in Fig. 6. Several of these conductors with their associated end-turns constitute a coil which is connected to the commutator 25. To facilitate winding these coils, which when completed constitute a single-layer winding, the rotor-supporting flanges 27 and 28 are formed with spaced, axial, end-projections 33 which serve as permanent winding fixtures for guiding and supporting the end-turns of the coils and the connections to the commutator, as will be seen best in Fig. 5. This construction insures that no more than one conductor enters or leaves the flux field at any one time, thus minimizing the possible instantaneous variation in the output voltage due to non-uniform distribution of the armature conductors. At the same time, the conductors 32 are spread out circumferentially over the face of the tube 30 so that the winding is radially only one conductor thick and occupies a minimum of radial air gap space, which reduces the excitation requirements.

The large skew angle of the armature conductors 32, as seen in Fig. 5, is dictated by mechanical rather than by electrical design and is used to advantage here in decreasing the cumulative effect of the centrifugal forces on the conductors over their length which would normally urge them radially out of the grooves 31 and possibly stress the conductors to deformity.

Adjustably secured to the bearing support 11 by means of bolts 34 and shouldered nuts 35 is an insulated brush-holder ring 36 carrying brushes 37 pivoted on pins 38 and connected by pig-tail leads 39 to terminals 40, as seen best in Fig. 4.

An external insulated terminal block 41 with terminals 42 is secured to the bearing support 11 by means of screws 43, and leads 44 and 45 connect the brush-terminals 40 to the external terminals 42.

The embodiment shown in Figs. 1, 2 and 3 has the flux field supplied by the permanent magnet inner core 16. Another embodiment is shown in Figs. 7 and 8 wherein the flux field is furnished by two permanent magnet slugs 46 and 47 fitted against the inner wall of a die-cast frame 48 and between arcuate iron pole-pieces 49 held as inserts in the frame. The inner core 50 has the same shuttle shape as before but is made of the same iron as the pole-pieces 49 and in this case has no permanent-magnet function. The end bearing supports 51 and 52 are secured by bolts 53 and 54 tapped into the pole-pieces 49 as shown in Fig. 8. Otherwise, the structure is the same as that described above for the first embodiment.

It will be seen from the constructions according to this invention that there are no rotating iron parts to affect the flux paths and there can, therefore, be no adverse effects from residual magnetism, hysteresis and eddy currents. The flux traverses a path of constant reluctance with no iron teeth in the armature core to induce tooth-tip pulsations in the output voltage as is the case with conventional machines. The armature winding has perfect circular symmetry, while the armature core is shuttle-shaped to provide a maximum reluctance for the cross-field flux. In this way the flux cutting the conductors of the armature coils undergoing commutation is minimized and with it, the reactance voltage, which normally shows up as a ripple in the output voltage, is reduced.

It will be noted that the armature is wound with the magnetic core located freely within the tube on which the winding is placed and this requires a self-supporting subassembly as seen in Fig. 5, and which may thereafter be handled in much the same manner as an ordinary rotor.

Having thus described the nature of the invention, what I claim herein is:

In a D. C. tachometer generator, a rotor structure comprising a preformed, non-magnetic, cylindrical tube mounted for continuous rotation within an annular air-gap and formed on its outer surface with equally-spaced, skewed grooves, conductors held in said grooves by ordinary winding tension and connected together and to a commutator to form a single-layer uniformly-distributed winding having a skew of at least ten conductors and a maximum radial thickness of one conductor.

References Cited in the file of this patent

UNITED STATES PATENTS

| | | |
|---|---|---|
| 262,136 | Sheridan | Aug. 1, 1882 |
| 377,683 | Mather | Feb. 7, 1888 |
| 1,803,493 | Volet | May 5, 1931 |
| 2,385,101 | Norman | Sept. 18, 1945 |

FOREIGN PATENTS

| | | |
|---|---|---|
| 802 | Great Britain | of 1913 |
| 144,769 | Australia | Jan. 16, 1952 |
| 619,481 | Great Britain | Mar. 9, 1949 |
| 712,845 | Germany | Oct. 27, 1941 |
| 852,367 | France | Oct. 23, 1939 |
| 673,793 | Great Britain | June 11, 1952 |
| 892,303 | Germany | Oct. 5, 1953 |
| 894,588 | Germany | Oct. 26, 1953 |